United States Patent [19]

Ishino et al.

[11] Patent Number: 5,466,643
[45] Date of Patent: Nov. 14, 1995

[54] HIGH ZIRCONIA FUSED CAST REFRACTORIES

[75] Inventors: Toshihiro Ishino; Otojiro Kida; Yoshihisa Beppu, all of Yokohama, Japan

[73] Assignee: Asahi Glass Company Ltd., Tokyo, Japan

[21] Appl. No.: 189,735

[22] Filed: Feb. 1, 1994

[30] Foreign Application Priority Data

Feb. 3, 1993 [JP] Japan .................................. 5-039424

[51] Int. Cl.⁶ ........................... C04B 35/48; C04B 35/484
[52] U.S. Cl. ........................... 501/105; 501/103; 501/127; 501/128; 501/133; 501/107
[58] Field of Search ................................ 501/103, 105, 501/127, 128, 133, 153, 154, 107

[56] References Cited

U.S. PATENT DOCUMENTS

| | | | |
|---|---|---|---|
| 3,632,359 | 1/1972 | Alper et al. | 501/103 |
| 4,336,339 | 6/1982 | Okumiya et al. | 501/103 |
| 4,705,763 | 11/1987 | Hayashi et al. | 501/103 |
| 5,023,218 | 6/1991 | Zanoli et al. | 503/103 |
| 5,086,020 | 2/1992 | Ishino et al. | 501/105 |

FOREIGN PATENT DOCUMENTS

| | | |
|---|---|---|
| 50-39090 | 12/1975 | Japan . |
| 63-285173 | 11/1988 | Japan . |
| 1-100068 | 4/1989 | Japan . |

Primary Examiner—Karl Group
Assistant Examiner—Michael Marcheschi
Attorney, Agent, or Firm—Oblon, Spivak, McClelland, Maier & Neustadt

[57] ABSTRACT

High zirconia fused cast refractories which include as chemical components of refractories in weight %, 85 through 91% of $ZrO_2$, 7.0 through 11.2% of $SiO_2$, 0.85 through 3.0% of $Al_2O_3$, 0.05 through 1.0% of $P_2O_5$, 0.05 through 1.0% of $B_2O_3$ and 0.01 through 0.12% of a summed amount of $K_2O$ and $Na_2O$, wherein the weight % of $K_2O$ is not smaller than the weight % of $Na_2O$.

9 Claims, No Drawings

HIGH ZIRCONIA FUSED CAST REFRACTORIES

BACKGROUND OF THE INVENTION

1. Field of the Invention

This invention relates to high zirconia fused cast refractories for a glass tank furnace having an excellent corrosion resistance, particularly suitable for a glass tank furnace of low alkali glass or for an electrical glass melting furnace.

2. Discussion of Background

Fused cast refractories are provided by melting a mixed raw material of refractories which has been prepared to predetermined components in an electric arc furnace normally employing graphite electrodes, casting molten material into a heat-insulated mold having a predetermined shape, and cooling to solidify the molten material. These refractories are known as refractories having very dense structures and excellent corrosion resistances, compared with normally employed bonded refractories (for instance, brick which is fired after press-forming).

Among such fused cast refractories, especially, refractories whose major component is zirconia ($ZrO_2$) are provided with good corrosion resistance against molten glass, and therefore, fused cast refractories having much content of $ZrO_2$ are preferably employed for glass tank furnaces.

As a former invention of high zirconia fused cast refractories including $ZrO_2$ of not smaller than 62 weight %, there is Japanese Examined Patent Publication No. 32408/1973. However, fused cast refractories which have been disclosed as Examples in the specification of the Japanese Examined Patent Publication No. 32408/1973 contain $ZrO_2$ of 88.7 weight % at the most, which indicates that there was no technology at that time to cast fused cast refractories including 90 weight % or more of $ZrO_2$ without cracking.

Thereafter, high zirconia fused cast refractories including $ZrO_2$ of not smaller than 90 weight % have been proposed in Japanese Examined Patent Publication No. 39090/1975 or Japanese Examined Patent Publication No. 12619/1984, and have been on sale. Thereafter, high zirconia fused cast refractories have been employed as refractories for glass tank furnaces, at portions of the glass tank furnaces wherein a particular corrosion resistance was required, since the high zirconia fused cast refractories were hard to contaminate glass matrix and their blistering behavior is insignificant. Further, in recent times, the usage of the high zirconia fused cast refractories is being widened to a field of a glass tank furnace which melts fine glass having small content of alkaline components at a high melting temperature.

These high zirconia fused cast refractories include a comparatively small amount of matrix glass whose major component is silica ($SiO_2$). Baddeleyite ($ZrO_2$) crystal which is a major component of these refractories, causes a volume change due to a reversible crystal phase transformation between a monoclinic crystal and a tetragonal crystal in a temperature range of 800° through 1250° C. which is peculiar to baddeleyite crystal. The matrix glass in the refractories is prepared to be a glass having a pertinent softness at 800° through 1250° C. which is the transformation temperature range of baddeleyite crystal, so as to absorb this volume change and to relax stresses caused in the refractories.

In high zirconia fused cast refractories proposed in the Japanese Examined Patent Publication No. 39090/1975 or the Japanese Examined Patent Publication No. 12619/1984, an alkaline component ($Na_2O$ or $K_2O$) is added to the refractories as a component for decreasing the viscosity of the matrix glass, which provides a pertinent viscosity capable of alleviating the stresses caused in the refractories, in the transformation temperature range of baddeleyite crystal.

However, when these refractories shown in the examples are employed as lining refractories of a glass tank furnace for melting low alkali glass, the alkaline component tends to dissolve in the molten glass. Moreover, when glass is electrically melted by feeding electricity directly through the molten glass, the matrix glass containing the alkaline component, that is present in these refractories, shows an ionic conductivity in the service temperature, and a portion of the fed electricity does not flow through the molten glass but flows through the refractories surrounding the molten glass and is uselessly consumed. Therefore, these high zirconia fused cast refractories are not suitable for the refractories for the electric glass melting furnace.

Japanese Examined Patent Publication No. 40018/1990 proposes high zirconia fused cast refractories wherein the content of alkaline component of $Na_2O$, $K_2O$ and the like in the refractories is restrained to not larger than 0.10 weight %, by containing much content of $H_2O$ having a large ionic radius that is not so effective to reduce the electric resistance and is provided with a high electric resistivity at a high service temperature. However, these high zirconia fused cast refractories show "chipping off phenomenon" wherein the surface layer of the refractories is partially chipped off in heating up the glass tank furnace, and is provided with the problem of thermal cycle resistance, wherein a volume increase after each thermal cycle is accumulated finally to cause cracking, when the refractories undergo thermal cycles which traverses the phase transformation temperature range.

Japanese Unexamined Patent Publication No. 285173/1988 proposes high zirconia fused cast refractories having a large electric resistivity at a high service temperature (1500° C.). These fused cast refractories are provided with a composition which does not substantially include the $Na_2O$ component having a small ionic radius and a considerably small electric resistivity. These fused cast refractories include $B_2O_3$ of 0.5 through 1.5 weight % and not larger than 1.5 weight % of $K_2O$ or the like having a large ionic radius, thereby adjusting the viscosity of the matrix glass, and having a large electric resistivity and can be cast with almost no cracking.

However, according to embodiment described in the specification, no example has been shown that the refractories are provided with the thermal cycle resistance. These fused cast refractories are believed to be poor at thermal cycle resistance, since the content of $SiO_2$ is not larger than 6.5 weight % in every case, and is silent on the presence or absence of the chipping off phenomena which causes defects in glass products and its method of solution.

In the meantime, Japanese Unexamined Patent Publication No. 100068/1989, Japanese Unexamined Patent Publication No. 218980/1991 and Japanese Unexamined Patent Publication No. 28175/1991, propose high zirconia fused cast refractories wherein the content of the alkaline component is not so much restricted and both the chipping off phenomenon and the thermal cycle resistance have been improved.

In case of the high zirconia fused cast refractories having a large electric resistivity at high service temperatures, wherein the content of the alkaline component is restrained to not larger than 0.10 weight %, the chipping off phenomenon of the refractories and the problem of causing crackings by the accumulation of volume increase after each thermal cycle, are expected yet to solve, to promote the quality and the yield rate of glass products and to provide the reliability and the durability of glass tank furnaces.

SUMMARY OF THE INVENTION

It is an object of the present invention to provide high zirconia fused cast refractories suitable for an electric glass melting furnace, having a large electric resistance at high service temperatures, causing no "chipping off phenomenon" whereby the surface layer of refractories is partially chipped off in temperature elevation, and causing no crackings by the accumulation of volume increase after each thermal cycle, that is, having thermal cycle resistance.

According to an aspect of the present invention, there is provided high zirconia fused cast refractories which include as chemical components of refractories in weight %, 85 through 91% of $ZrO_2$, 7.0 through 11.2% of $SiO_2$, 0.85 through 3.0% of $Al_2O_3$, 0.05 through 1.0% of $P_2O_5$, 0.05 through 1.0% of $B_2O_3$ and 0.01 through 0.12% of a summed amount of $K_2O$ and $Na_2O$, wherein the weight % of $K_2O$ is not smaller than the weight % of $Na_2O$.

According to another aspect of the present invention, there is provided high zirconia fused cast refractories which include 85 through 91 wt % of $ZrO_2$, 7.0 through 11.2 wt % of $SiO_2$ and 0.85 through 3.0 wt % of $Al_2O_3$, have an electrical resistivity at 1500° C. not smaller than 100 Ωcm, show a volume increase smaller than 3% and form substantially no cracking after 40 times thermal cycles between 800° C. and 1250° C. and show no chipping off in their heat up.

DETAILED DESCRIPTION OF PREFERRED EMBODIMENTS

The high zirconia fused cast refractories of this invention are refractories a large portion of whose chemical component, or 85 through 91 wt % thereof is composed of zirconia ($ZrO_2$), and whose major mineral component is baddeleyite crystal, which shows excellent corrosion resistance when the refractories are employed in a place contacting molten glass. At the same time, the content of the alkaline component is small, and the refractories mainly contain $K_2O$ as the alkaline component having a large ionic radius and a small mobility. Therefore, the electric resistivity of the refractories is large in the high service temperature range.

The content of $ZrO_2$ in the high zirconia fused cast refractories is not smaller than 85 wt %, preferably not smaller than 88 wt %, since the more the content of the $ZrO_2$ in the refractories, the more excellent the corrosion resistance against molten glass. However, when the content of $ZrO_2$ is larger than 91 wt %, the amount of the matrix glass in the refractories is relatively reduced, the volume change accompanied by the transformation of baddeleyite crystal can not be absorbed, and the thermal cycle resistance is deteriorated. Accordingly, the content of $ZrO_2$ is not larger than 91 wt %.

$SiO_2$ is an essential component for forming the matrix glass which alleviates stresses caused in the refractories. It is necessary for the refractories to include $SiO_2$ by not smaller than 7.0 wt %, to obtain the fused cast refractories of practical dimensions having no cracking. However, when the content of the $SiO_2$ is larger than 11.2 wt %, the corrosion resistance is deteriorated. Therefore, the content of the $SiO_2$ component is not larger than 11.2 wt %, preferably not larger than 10.0 wt %.

$Al_2O_3$ plays a role of adjusting a relationship between the temperature and the viscosity of the matrix glass, and shows an effect to reduce the content of $ZrO_2$ in the matrix glass. When the content of $ZrO_2$ in the matrix glass is small, the precipitation of zircon ($ZrO_2.SiO_2$) crystal in the matrix glass which has been observed in the conventional refractories, is restrained and the tendency of accumulating the volume increase after each thermal cycle is significantly reduced.

The content of $Al_2O_3$ in the refractories is not smaller than 0.85 wt %, preferably not smaller than 1.0 wt %, to effectively reduce the content of $ZrO_2$ in the matrix glass. Further, by limiting the content of $Al_2O_3$ to not larger than 3.0%, the matrix glass is not degenerated by the precipitation of crystals such as mullite in the matrix glass, in casting and using the refractories, and the crackings are not caused in the refractories.

Accordingly, the content of $Al_2O_3$ in the invented high zirconia fused cast refractories is 0.85 through 3.0 wt %, preferably 1.0 through 3.0 wt %. In the high zirconia fused cast refractories which are cast by adjusting the compositions of the refractories in the above ranges, the thermal cycle resistance is improved, that is, the accumulation of volume increase after each thermal cycle is restrained in a range practically having no problems, and the chipping off phenomenon can substantially be eliminated.

Further, the viscosity of the matrix glass at 800° through 1250° C. is pertinently adjusted even when the content of the alkaline component is small, since $B_2O_3$ and $P_2O_5$ are contained in the refractories other than a small amount of the alkaline component. Since the volume increase in using the refractories is reduced, there is no tendency in the refractories wherein crackings are caused by the accumulation of the volume increase after each thermal cycle, even when the refractories repetitively undergo thermal cycles traversing the transformation temperature of baddeleyite crystal.

$B_2O_3$ is a component which is mainly contained in the matrix glass along with $P_2O_5$, which softens the matrix glass cooperating with $P_2O_5$ as the substitute of the alkaline component, and does not reduce the electric resistivity of the refractories at high service temperatures.

The content of $B_2O_3$ shows an effect of adjusting the viscosity of the matrix glass when it is not smaller than 0.05 wt %, since the amount of the matrix glass in the high zirconia fused cast refractories is small. However, dense fused cast refractories can not be cast when the content of $B_2O_3$ is too large. Accordingly, the content of $B_2O_3$ is 0.05 to 1.0 wt %, preferably 0.10 through 1.0 wt %.

Almost all of $P_2O_5$ is contained in the matrix glass along with $B_2O_3$ and the alkaline component, which adjusts (softens) the viscosity of the matrix glass in the transformation temperature range of baddeleyite crystal to thereby prevent the formation of crackings due to stresses caused by the volume change accompanied by the transformation of baddeleyite crystal. Further, $P_2O_5$ and $B_2O_3$ are components which do not color glass even when they are dissolved in the glass, when the refractories are employed in the glass tank furnace. Further, there is an advantage wherein the melting of the mixed raw material of refractories is facilitated by adding $P_2O_5$ to the mixed raw material of refractories, and the power consumption required for producing the refractories can be reduced.

Since the amount of the matrix glass in the high zirconia fused cast refractories is small, the content of $P_2O_5$ in the matrix glass is relatively large even when the content of $P_2O_5$ in the refractories is small. Therefore, the effect of adjusting the viscosity of the matrix glass can be provided when $P_2O_5$ is contained in the refractories by not smaller than 0.05 wt %. Further, when the content of $P_2O_5$ is larger than 1.0%, the properties of the matrix glass are changed and there is a tendency to help formation of cracks accompanied by the accumulation of the volume increase after each thermal cycle. Therefore, the content of $P_2O_5$ in the refractories which is suitable for adjusting the viscosity of the matrix glass is 0.05 through 1.0 wt %, preferably 0.1 through 1.0 wt %.

Further, a summed amount of the content of the alkaline component composed of $K_2O$ and $Na_2O$ as oxides is not larger than 0.12 wt % whereby the electric resistance of the refractories in the high service temperature range is provided with a sufficiently large value. The alkaline component of not smaller than 50 wt %, preferably not smaller than 70 wt % is $K_2O$ having a small ionic mobility in the matrix glass. However, it is difficult to produce fused cast refractories without crackings when the summed amount of $K_2O$ and $Na_2O$ is smaller than 0.01 wt %. Therefore, the summed amount of $K_2O$ and $Na_2O$ is not smaller than 0.01 wt %. Further, it is preferable that the content of $Na_2O$ is not smaller than 0.008 wt % and the content of $K_2O$ is in a range of 0.02 through 0.10 wt %, to stably cast the high zirconia fused cast refractories without crackings.

Further, with respect to the content of $Fe_2O$ and $TiO_2$ which are contained in the mixed raw material as impurities, when the summed amount is not larger than 0.55 wt %, there is no problem of coloring glass in a normal glass tank furnace, and preferably the summed amount does not exceed 0.30 wt %. Further, it is not necessary to include alkaline-earth metal oxides in the refractories, and it is preferable that the content of the alkaline-earth metal oxides is smaller than 0.10 wt %.

Therefore, in preferable high zirconia fused cast refractories of this invention, the refractories include as chemical components of refractories in weight %, 88 through 91% of $ZrO_2$, 7.0 through 10% of $SiO_2$, 1.0 through 3.0% of $Al_{2l\,o}$, 0.10 through 1.0% of $P_2O_5$ and 0.10 through 1.0% of $B_2O_3$.

In another preferable high zirconia fused cast refractories of this invention, the electric resistivity of the refractories at 1500° C. is not smaller than 100 Ωcm, preferably not smaller than 150 Ωcm. By satisfying the above condition, the electric power is not uselessly consumed by flowing the electric current through the lining refractories of an electric glass melting furnace, whereby the electric current flows directly through the molten glass.

As an inherent characteristic of the high zirconia fused cast refractories, the invented high zirconia fused cast refractories are excellent in the corrosion resistance against molten glass, the electric resistivity at the high service temperature of 1500° C. is as large as 100 Ωcm or more, no chipping off phenomenon is shown which forms defects in glass products, and no crackings are formed in the refractories by the accumulation of the volume increase after each thermal cycle (excellent in the thermal cycle resistance). Therefore, the invented fused cast refractories are particularly suitable for the electric glass melting furnace.

The inventors presume as follows with respect to the problem of the thermal cycle resistance of the high zirconia fused cast refractories. In the conventional high zirconia fused cast refractories, $ZrO_2$ dissolved in the matrix glass reacts with $SiO_2$ in the matrix glass to precipitate zircon ($ZrO_2.SiO_2$) crystal in the matrix glass when the refractories are employed in the glass tank furnace.

As a result, $SiO_2$ in the matrix glass is reduced, the amount of the matrix glass is relatively reduced, the viscosity of the matrix glass increases by the presence of the precipitated zircon crystal, the viscosity of the matrix glass is deviated from a pertinent viscosity range which enables the relaxation of stresses due to the transformation of baddeleyite crystal and the matrix glass can not follow up the volume change accompanied by the transformation of baddeleyite crystal.

That is, when the relative amount of the matrix glass is reduced and the matrix glass is degenerated, spacings among baddeleyite crystals and cleavages or microcrackings formed in baddeleyite crystals accompanied by the transformation of baddeleyite crystals, can not be filled with the matrix glass, the spacings and the cleavages are accumulated as vacancies, and as a result, the bulk of the refractories increases showing the accumulation of the volume increase after each thermal cycle.

In the invented high zirconia fused cast refractories, a necessary and sufficient amount of matrix glass is provided in the refractories by maintaining the content of $SiO_2$ in the refractories to not smaller than 7.0%, and $Al_2O_3$ is contained in the refractories by not smaller than 0.85%. Accordingly, the content of $ZrO_2$ in the matrix glass is reduced, the precipitation of zircon crystals in the matrix glass is restrained, and the decrease of the matrix glass by the precipitation of zircon crystals and the change in the viscosity of the matrix glass are significantly restrained, thereby providing an excellent thermal cycle resistance.

At present, the reason why the chipping off phenomenon is improved is not well known. However, the reason is presumed that the decrease in the amount of $ZrO_2$ dissolved in the matrix glass and the pertinent decrease in the viscosity of the matrix glass in the service temperature range contribute to the improvement to some degree, by increasing the content of $Al_2O_3$ in the refractories in comparison with that in the conventional refractories.

EXAMPLES

A specific explanation will be given of the high zirconia fused cast refractories by Examples as follows. However, the present invention is not restricted to these Examples.

A zirconia powder removed of silica from zircon which is a raw material of zirconia, was mixed with powders of low soda alumina, silica, $BPO_4$, $B_2O_3$, $K_2CO_3$ and the like into a mixed raw material of refractories, which was charged into a single phase arc electric furnace having an output capacity of 500 kVA and two graphite electrodes, and was completely molten at a temperature of 2200° through 2400° C.

The molten refractories were cast in a graphite mold having an inner space of 160 mm×200 mm×350 mm which had previously been embedded in a heat insulating powder of alumina by the Bayer's process, which was cooled to a temperature around the room temperature. The chemical analysis data and the investigated properties of the obtained various high zirconia fused cast refractories are shown in Table 1 and Table 2. Although not shown in Tables 1 and 2, the contents of $Fe_2O$ and $TiO_2$ were respectively not larger than 0.3%, and the contents of MgO and CaO were respectively not larger than 0.1%.

Among these Examples, the refractories shown in Test No. 1 through 10 are Examples of this invention and the refractories in Test No. 11 through 16 are Comparative Examples. In melting and casting these high zirconia fused cast refractories, portions of Na₂O, , K₂O, P₂O₅ and SiO₂ were sublimated, and therefore, the contents of these components in the produced high zirconia fused cast refractories were more or less reduced compared with the chemical compositions of the original mixed raw materials.

The evaluation of the thermal cycle resistance of the cast high zirconia fused cast refractory was performed as follows. A test piece of 40 mm×40 mm×40 mm was cut off from respective fused cast refractories. Each test piece was put into an electric furnace wherein the temperature of each test piece was elevated from the room temperature to 800° C. by a rate of 300° C. per hour. Then the temperature was elevated from 800° C. to 1250° C. in 1 hour, was held at 1250° C. for 1 hour, was lowered to 800° C. in 1 hour, and was held at 800° C. for 1 hour. The elevation and lowering of temperature between 800° C. and 1250° C. forms 1 cycle. The test piece underwent 40 cycles and was cooled to the room temperature.

The test piece was determined to be refractories excellent in the thermal cycle resistance when crackings were not observed in the appearance of the refractories and the volume increase after the thermal cycle test was not larger than 3%. The corrosion resistance indices of the respective fused cast refractories were determined as follows. A rod-like test piece having dimensions of 15 mm×15 mm×50 mm was cut off from respective fused cast refractories, which was hung in a platinum crucible for 48 hours in which pieces of ordinary sheet glass was put and molten at 1500° C., a maximum corroded depth of the rod-like test piece was measured to be a corrosion amount (mm), and the corrosion resistance index of the respective fused cast refractories was provided by corrosion resistance index =corrosion amount (mm) of No. 11 test piece/corrosion amount (mm) of test piece.

The formation of stone (defect) and the coloring of glass, were determined by the presence or absence of the stone and the coloring of glass remained in the platinum crucible wherein the above corrosion resistance test had been performed. Although not shown in the Tables, the coloring of glass by the invented high zirconia fused cast refractories was not recognized for each test piece.

TABLE 1

| Test No. | 1 | 2 | 3 | 4 | 5 | 6 | 7 | 8 |
|---|---|---|---|---|---|---|---|---|
| Analysis value Weight % | | | | | | | | |
| $ZrO_2$ | 89.2 | 87.9 | 88.5 | 90.2 | 86.7 | 85.0 | 87.1 | 88.3 |
| $SiO_2$ | 8.4 | 8.8 | 7.2 | 7.4 | 9.3 | 11.0 | 8.8 | 9.0 |
| $Al_2O_3$ | 1.1 | 2.0 | 3.0 | 1.1 | 2.5 | 2.5 | 2.5 | 1.3 |
| $Na_2O$ | 0.01 | 0.01 | 0.01 | 0.01 | 0.01 | 0.01 | 0.01 | 0.01 |
| $K_2O$ | 0.05 | 0.06 | 0.04 | 0.05 | 0.05 | 0.05 | 0.09 | 0.04 |
| $P_2O_5$ | 0.4 | 0.3 | 0.3 | 0.4 | 0.5 | 0.5 | 0.6 | 0.10 |
| $B_2O_3$ | 0.4 | 0.5 | 0.5 | 0.4 | 0.5 | 0.5 | 0.5 | 0.8 |
| Presence or absence of cracking | None | None | None | None | None | None | None | None |
| Bulk density | 4.92 | 4.83 | 4.85 | 5.00 | 4.80 | 4.70 | 4.80 | 4.90 |
| Compressive strength kg/cm² | 4000 | — | — | — | — | — | — | — |
| Electric resistivity (1500° C.) Ω · cm | 590 | 310 | 300 | 400 | 320 | 420 | 180 | 280 |
| After thermal cycle test | | | | | | | | |
| Volume increase % | 1.5 | 2.0 | 2.5 | 2.0 | 2.5 | 2.0 | 2.0 | 1.5 |
| Presence or absence of cracking | None | None | None | None | None | None | None | None |
| Properties against molten glass | | | | | | | | |
| Corrosion resistance index | 2.0 | 2.0 | 2.0 | 2.4 | 1.8 | 1.7 | 2.1 | 1.8 |
| Formation of stone | None | None | None | None | None | None | None | None |

TABLE 2

| Test No. | 9 | 10 | 11 | 12 | 13 | 14 | 15 | 16 |
|---|---|---|---|---|---|---|---|---|
| Analysis value Weight % | | | | | | | | |
| $ZrO_2$ | 86.5 | 88.2 | 41.0 | 90.0 | 89.9 | 84.0 | 95.3 | 85.8 |
| $SiO_2$ | 8.5 | 9.5 | 12.0 | 5.0 | 8.7 | 11.5 | 3.5 | 8.0 |
| $Al_2O_3$ | 2.4 | 1.2 | 46.0 | 2.5 | 0.7 | 3.3 | 0.6 | 1.0 |
| $Na_2O$ | 0.01 | 0.01 | 0.8 | 0.5 | 0.01 | 0.01 | 0.01 | 0.03 |
| $K_2O$ | 0.05 | 0.04 | 0.0 | — | 0.05 | 0.06 | 0.01 | 0.05 |
| $P_2O_5$ | 0.7 | 0.5 | 0.0 | 1.5 | 0.2 | 0.4 | 0.2 | 2.5 |
| $B_2O_3$ | 1.0 | 0.10 | 0.0 | — | 0.3 | 0.4 | 0.3 | 2.5 |
| Rare earth oxide | — | — | — | 0.9 | — | — | — | — |
| Presence or absence of cracking | None | None | None | Present | None | Present | None | None |
| Bulk density | 4.85 | 4.90 | 4.00 | 5.14 | 4.88 | 4.60 | 5.43 | 4.50 |
| Compressive strength kg/cm² | — | — | 3500 | — | — | — | 4100 | — |
| Electric resistivity (1500° C.) Ω · cm | 330 | 300 | 90 | 45 | 890 | 540 | 220 | 130 |
| After thermal cycle test | | | | | | | | |
| Volume increase % | 1.0 | 2.5 | — | — | 10.0 | 20 | 30 | 30 |
| Presence or absence of cracking | None | None | — | — | Present | Present | Present | Present |
| Properties against molten glass | | | | | | | | |
| Corrosion resistance index | 1.6 | 2.5 | 1.0 | 1.25 | 1.8 | 1.3 | 2.3 | 1.1 |
| Formation of stone | None | None | Present | Present | None | Present | Present | Present |

Test No. 11 shows zirconia fused cast refractories which is widely employed in glass tank furnaces, at present, and which is exemplified for comparison of the characteristics with the invented high zirconia fused cast refractories. Further, Test No. 12 shows refractories wherein rare earth oxides were added as components for stabilizing zirconia. However, in case of Test No. 12, practical refractories can not be cast since crackings were caused in cooling due to the large coefficient of thermal expansion.

Further, in the fused cast refractories of Test No. 13 through 16, the chipping off phenomenon was observed. By contrast, in the fused cast refractories of Test No. 1 through 10 which are the Examples of this invention, the chipping off phenomenon was not observed.

The above test results reveal that the problems of the thermal cycle resistance and the chipping off phenomenon which have been pointed out in the conventional high zirconia fused cast refractories, wherein the content of the alkaline component is reduced and the electric resistivity at high service temperature is increased, are solved in the high zirconia fused cast refractories of this invention.

The invented high zirconia fused cast refractories are suitable as refractories for an electric glass melting furnace, since the electric resistivity is large in its service temperature range, the refractories are excellent in the corrosion resistance against molten glass, and are excellent in the thermal cycle resistance whereby almost no formation of crackings is observed and the chipping off phenomenon is not caused. Accordingly, when the invented high zirconia fused cast refractories are employed in a glass tank furnace, very small fragments are not separated from portions of the crackings or broken pieces of the refractory into the molten glass. As a result, stones (defect) in a glass product are not caused, and therefore, the service life and the reliability of the glass tank furnace are promoted.

In the present age wherein the necessity for high grade refractories suitable for a glass tank furnace for melting glass having a high melting temperature and containing no alkaline component and producing high purity glass products, for instance, fine glass products such as glass substrates for electronics, is increasing, the invented high zirconia fused cast refractories are high grade refractories capable of meeting the request of these high technology industry, and when its effect of promoting the quality and the yield rate of these fine glass products is considered, its industrial utilization effect is enormous.

What is claimed is:

1. High zirconia fused cast for refractories comprising, in weight %, 85 through 91% of $ZrO_2$, 7.0 through 11.2% of $SiO_2$, 1.1 through 3.0% of $Al_2O_3$, 0.05 through 1.0% of $P_2O_5$, 0.05 through 1.0% of $B_2O_3$ and 0.01 through 0.12% of a summed amount of $K_2O$ and $Na_2O$, wherein the weight % of $K_2O$ is not smaller than the weight % of $Na_2O$;

wherein said high zirconia fused cast refractories have a volume increase smaller than 10% after 40 thermal cycles between 800° C. and 1250° C.

2. The high zirconia fused cast refractories according to claim 1, comprising in wt. %, 88 through 91% of $ZrO_2$, 7.0 through 10% of $SiO_2$, 1.1 through 3.0% of $Al_2O_3$, 0.10 through 1.0% of $P_2O_5$ and 0.10 through 1.0% of $B_2O_3$.

3. The high zirconia fused cast refractories according to claim 1, wherein an electrical resistivity of the high zirconia fused cast refractories at 1500° C. is not smaller than 100 $\Omega$cm.

4. The high zirconia fused cast refractories according to claim 1, wherein the high zirconia fused cast refractories are employed for an electric glass melting furnace.

5. High zirconia fused cast refractories comprising, 85 through 91 wt. % of $ZrO_2$, 7.0 through 11.2 wt. % of $SiO_2$ and 1.1 through 3.0 wt. % of $Al_2O_3$, having an electrical resistivity of 1500° C. not smaller than 100 $\Omega$cm, show a volume increase smaller than 3% after 40 thermal cycles between 800° C. and 1250° C. and show no chipping in there heat up.

6. The high zirconia fused cast refractories according to claim 1, wherein said cast refractories comprise no more than 0.3% $Fe_2O_3$, and no more than 0.3% of $TiO_2$.

7. The high zirconia fused cast refractories according to claim 2, wherein said cast refractories comprise no more than 0.3% $Fe_2O_3$, and no more than 0.3% of $TiO_2$.

8. The high zirconia fused cast refractories according to claim 1, wherein said cast refractories comprise no more than 0.1% MgO, and no more than 0.1% CaO.

9. The high zirconia fused cast refractories according to claim 2, wherein said cast refractories comprise no more than 0.1% MgO, and no more than 0.1% CaO.

* * * * *